United States Patent
Ong et al.

(10) Patent No.: US 8,341,337 B1
(45) Date of Patent: Dec. 25, 2012

(54) DATA STORAGE DEVICE BOOTING FROM SYSTEM DATA LOADED BY HOST

(75) Inventors: Choo-Bhin Ong, Foothill Ranch, CA (US); Tao Lin, Santa Clara, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 323 days.

(21) Appl. No.: 12/751,696

(22) Filed: Mar. 31, 2010

(51) Int. Cl.
*G06F 13/00* (2006.01)

(52) U.S. Cl. .. 711/103; 711/105; 711/112; 711/E12.103

(58) Field of Classification Search .................. None
See application file for complete search history.

(56) References Cited

U.S. PATENT DOCUMENTS

| | | | |
|---|---|---|---|
| 5,890,219 A | 3/1999 | Scaringella et al. | |
| 6,320,714 B1 | 11/2001 | Moon et al. | |
| 6,591,376 B1 * | 7/2003 | VanRooven et al. | 714/36 |
| 6,618,930 B1 | 9/2003 | Fish et al. | |
| 7,254,525 B2 | 8/2007 | Briggs et al. | |
| 7,430,659 B2 | 9/2008 | Jordan et al. | |
| 7,480,829 B2 | 1/2009 | Dickenson et al. | |
| 7,583,457 B2 | 9/2009 | Miller et al. | |
| 8,049,980 B1 | 11/2011 | Emami | |
| 2002/0032881 A1 * | 3/2002 | Ng et al. | 714/5 |
| 2002/0178351 A1 * | 11/2002 | Ott | 713/2 |
| 2004/0148478 A1 | 7/2004 | Leung | |
| 2004/0243385 A1 | 12/2004 | Rothman et al. | |
| 2005/0223372 A1 | 10/2005 | Borchers | |
| 2006/0236198 A1 * | 10/2006 | Lintz et al. | 714/758 |
| 2007/0011493 A1 * | 1/2007 | Du et al. | 714/36 |
| 2007/0074068 A1 * | 3/2007 | Hsieh | 714/6 |
| 2007/0157015 A1 * | 7/2007 | Swanson et al. | 713/2 |
| 2007/0168564 A1 * | 7/2007 | Conley et al. | 710/1 |
| 2007/0214348 A1 * | 9/2007 | Danielsen | 713/2 |
| 2007/0292114 A1 | 12/2007 | German et al. | |
| 2008/0040596 A1 * | 2/2008 | Mai et al. | 713/2 |
| 2009/0100237 A1 | 4/2009 | Orikasa et al. | |

\* cited by examiner

*Primary Examiner* — Edward Dudek, Jr.
*Assistant Examiner* — Sean D Rossiter

(57) ABSTRACT

A data storage device (DSD) is disclosed comprising a non-volatile memory (NVM) operable to store system data for accessing the NVM, and a semiconductor memory. Whether to receive the system data from a host is determined prior to attempting to read the system data from the NVM. When the system data is received from the host, the received system data is stored in the semiconductor memory. A command is received from the host to boot the DSD, and the system data is read from the semiconductor memory to boot the DSD.

28 Claims, 7 Drawing Sheets

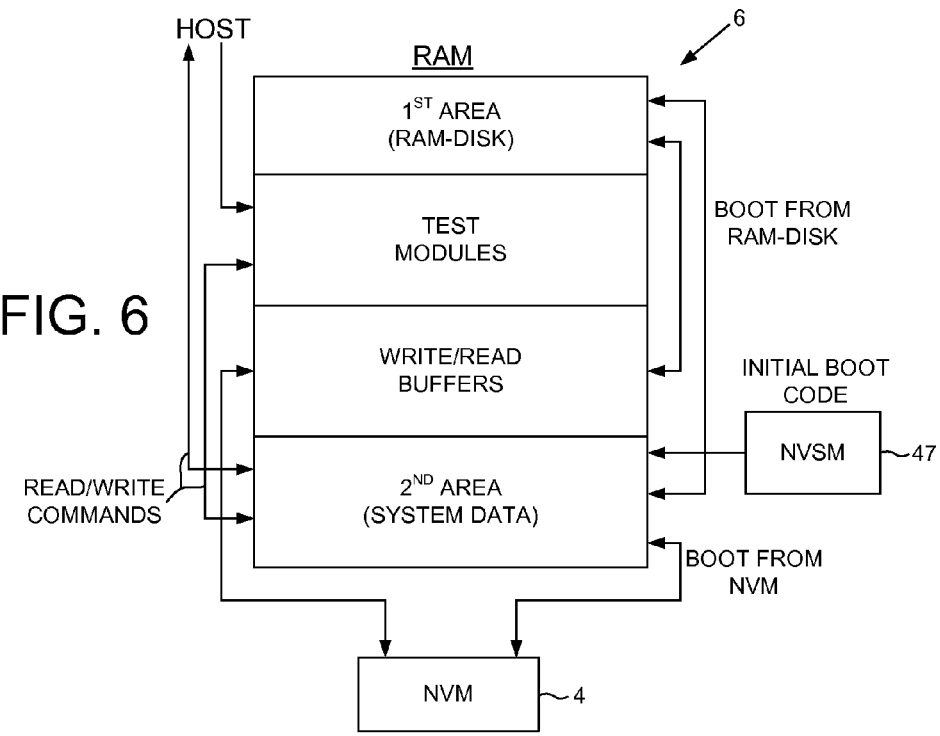
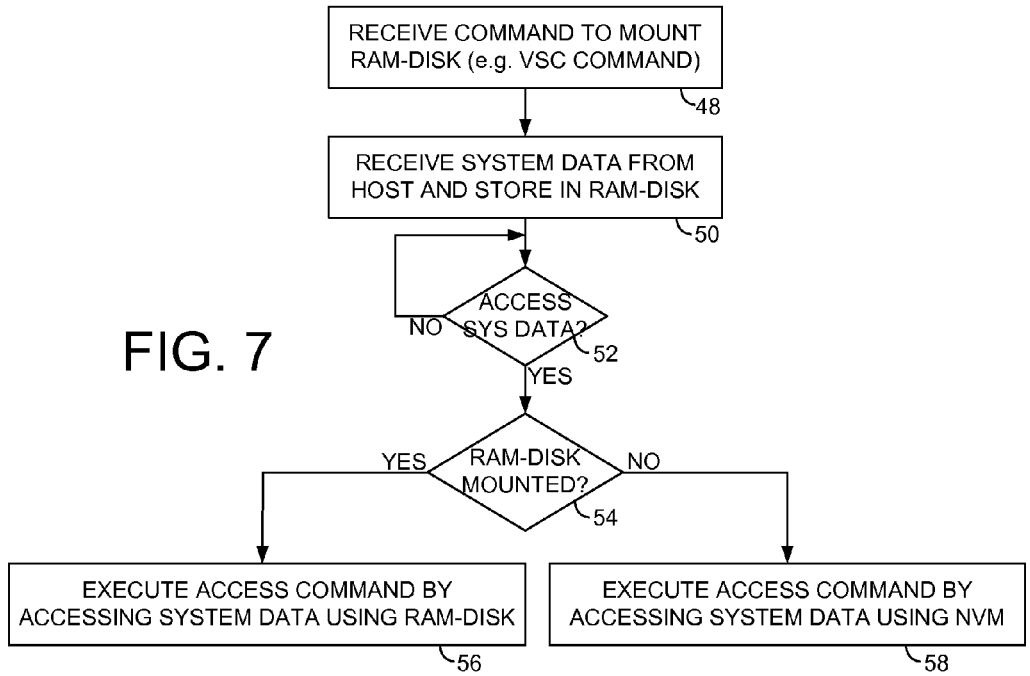

DATA STORAGE DEVICE BOOTING FROM SYSTEM DATA LOADED BY HOST

BACKGROUND

Data storage devices, such as disk drives and solid state drives are employed in numerous areas such as computer systems (e.g., desktops, laptops, portables, etc.) and consumer devices (e.g., music players, cell phones, cameras, etc.). User data is typically stored in a non-volatile memory, such as a magnetic disk or a non-volatile semiconductor memory (e.g., Flash memory). In order to enable defect mapping (mapping out of defective memory segments of the non-volatile memory), as well as enable wear leveling in solid state drives, the memory segments are typically accessed indirectly by mapping logical block addresses (LBAs) to physical block addresses (PBAs). That is, host access commands (write or read) comprise an LBA that is mapped to a PBA representing a memory segment, where the PBA may change over time due to relocating from a grown defect, or wear leveling to evenly distribute access to the memory segments.

When a data storage device is powered on, it typically reads system data (defect management, write/read parameters, operating modules) from a reserved area of the non-volatile memory (effectively booting the data storage device). Similar to a personal computer, a data storage device may become unbootable when the system data stored in the non-volatile memory becomes corrupted or unrecoverable due to defects, programming errors, etc. It is therefore desirable to enable a data storage device (e.g., a solid state drive or a disk drive) to complete a boot operation when the system data stored in the non-volatile memory is unrecoverable or corrupted.

BRIEF DESCRIPTION OF THE DRAWINGS

FIG. 6 shows an embodiment of the present invention wherein the semiconductor memory stores the system data and test modules for testing components of the DSD.

FIG. 7 is a flow diagram according to an embodiment of the present invention wherein a command is received from the host to mount a RAM-DISK which is used in place of the NVM including to store the system data received from the host.

DETAILED DESCRIPTION OF EMBODIMENTS OF THE INVENTION

Figure 1:
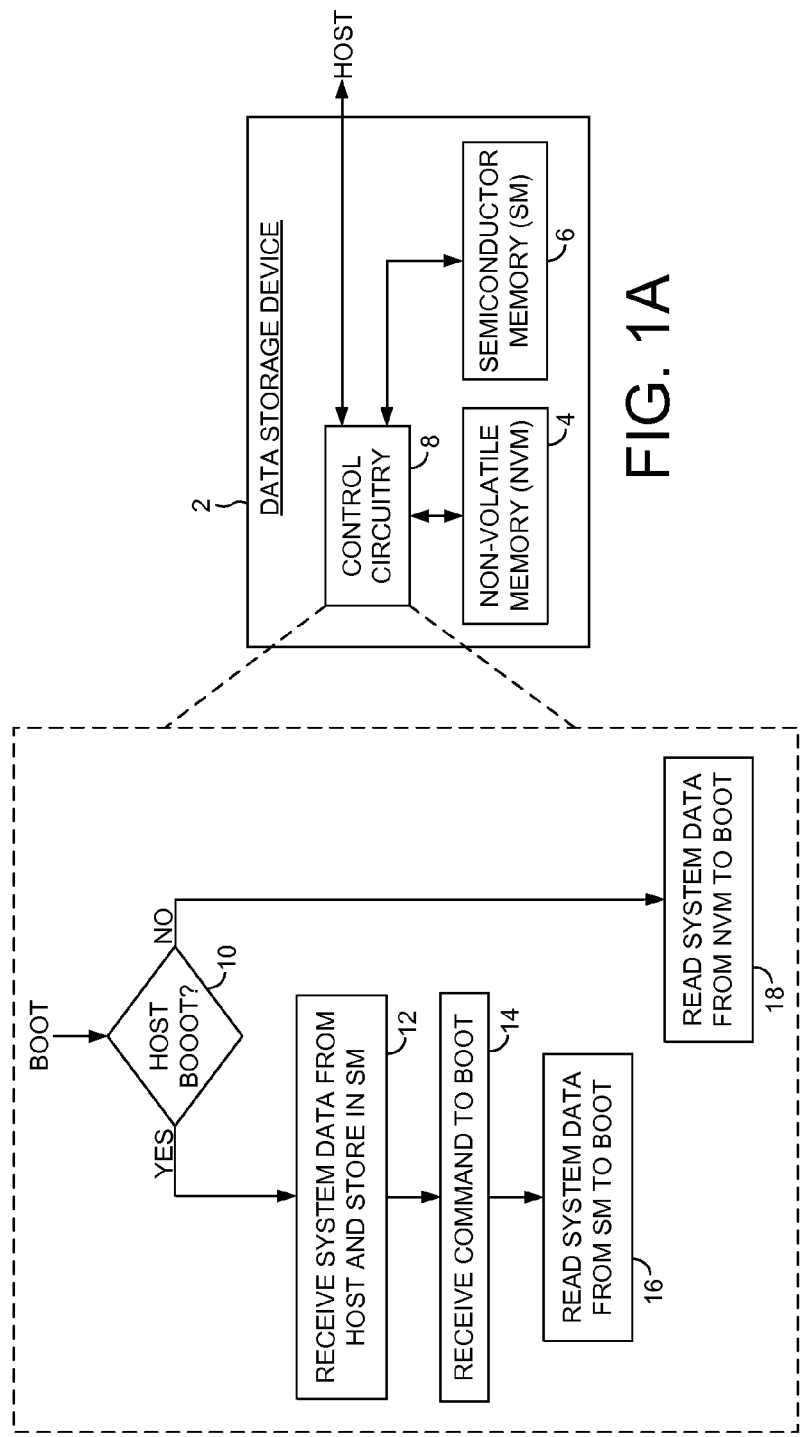
FIG. 1A shows a data storage device (DSD) according to an embodiment of the present invention comprising a non-volatile memory (NVM) operable to store system data, a semiconductor memory, and control circuitry.
FIG. 1B is a flow diagram according to an embodiment of the present invention wherein the DSD receives the system data from a host during a boot operation.

FIG. 1A shows a data storage device (DSD) 2 according to an embodiment of the present invention comprising a non-volatile memory (NVM) 4 operable to store system data for accessing the NVM 4, and a semiconductor memory 6. The DSD 2 further comprises control circuitry 8 for executing the flow diagram of FIG. 1B, wherein whether to receive the system data from a host is determined prior to attempting to read the system data from the non-volatile memory (step 10). When the system data is received from the host, the received system data is stored in the semiconductor memory (step 12). A command is received from the host to boot the DSD (step 14), and the system data is read from the semiconductor memory to boot the DSD (step 16). When the system data is not received from the host (step 10), the system data is read from the NVM in order to boot the DSD (step 18).

The control circuitry 8 in the DSD 2 may determine whether to receive the system data from the host in any suitable manner. In one embodiment, the system data stored in the NVM 4 may be corrupted such that when the control circuitry 8 attempts to boot the DSD 2 from the NVM 4 the control circuitry 8 will hang. When this happens, the DSD 2 is configured to receive the system data from the host during a subsequent boot operation using any suitable technique. In one embodiment, the DSD 2 may execute pre-boot module (e.g., stored in a non-volatile semiconductor memory) prior to accessing the NVM 4 and then wait for a host command before proceeding. The host command may direct the DSD 2 to receive the system data from the host, or to read the system data from the NVM 4 in order to boot the DSD 2. In another embodiment, the DSD 2 may evaluate a jumper configured by a user to determine whether to wait for a host command for direction on loading the system data. In this embodiment, if the jumper is configured to bypass the wait state, the DSD 2 may boot from the NVM 4 without having to wait for a command from the host. Alternatively, the jumper may be configured into a state that requires the system data be received from the host (i.e., the DSD requests the system data from the host). In another embodiment described below, the DSD 2 may comprise a watchdog timer that sets a flag when a hang condition is detected. After setting the flag, during a subsequent boot operation the DSD 2 requests the system data from the host rather than attempt to read the corrupted system data from the NVM 4. In yet another embodiment, the DSD 2 may be manufactured with a flag preset (e.g., in firmware) that causes the DSD 2 to enter a wait state during boot operations in order to receive the system data from the host. This may facilitate an embodiment wherein certain parameters of the DSD 2 must be calibrated (e.g., read/write parameters of a disk drive) before the NVM 4 is accessible.

Figure 2:
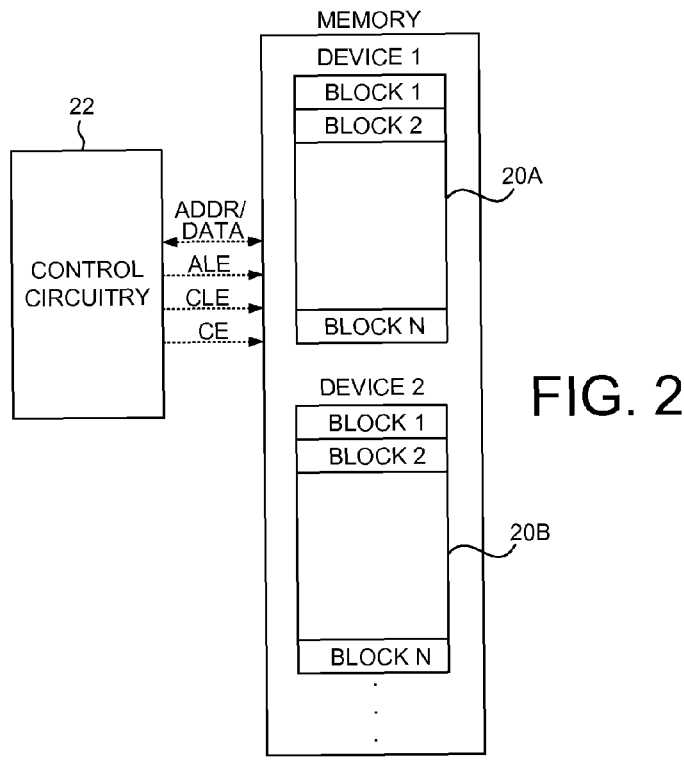
FIG. 2 shows an embodiment of the present invention wherein the DSD comprises a solid state drive.
Figure 3:
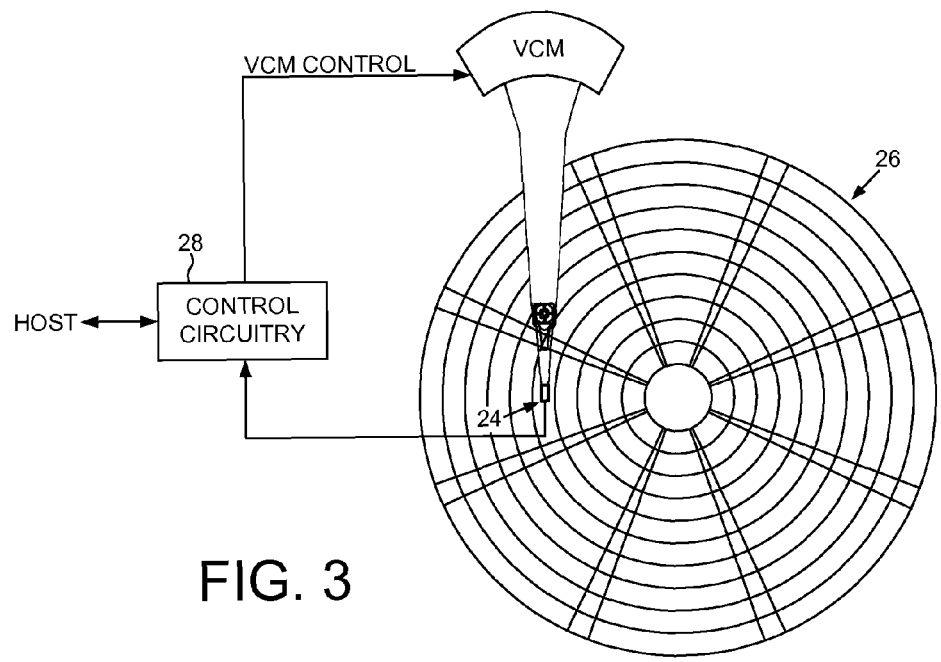
FIG. 3 shows an embodiment of the present invention wherein the DSD comprises a disk drive.

Any suitable DSD may be employed in the embodiments of the present invention. FIG. 2 shows a DSD comprising a solid state drive including a plurality of non-volatile semiconductor memories 20A, 20B, etc., such as Flash memories, and control circuitry 22 for executing at least part of the flow diagrams described herein. The control circuitry 22 includes a volatile semiconductor memory (e.g., RAM) for loading the system data (either from the NVM or from the host) during boot operations. FIG. 3 shows an embodiment of the present invention wherein the DSD comprises a disk drive including a head 24 actuated over a disk 26. Control circuitry 28 reads system data from the disk 26 during boot operations and stores the system data in a volatile semiconductor memory (e.g., RAM). If the system data in the NVM 4 is unrecoverable or corrupted, the control circuitry 28 receives the system data from a host.

Figure 4:
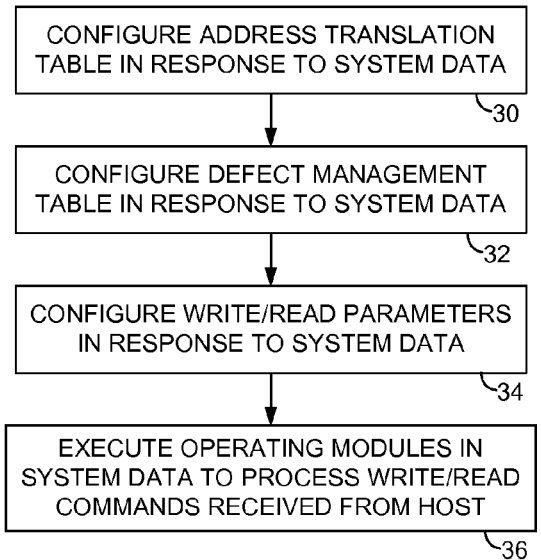
FIG. 4 is a flow diagram according to an embodiment of the present invention wherein the system data is for configuring an address translation table, a defect management table, write/read parameters, and executing operating modules to process write/read commands.

The system data loaded by the DSD 2 during a boot operation may be used for any suitable purpose. FIG. 4 is a flow diagram according to an embodiment of the present invention wherein the system data is used to configure an address translation table for mapping logical block addresses (LBAs) received from a host to physical block addresses (PBAs) representing memory segments in the NVM (step 30). The system data may alternatively be used to configure a defect management table for mapping out defective areas of the NVM (step 32). In another embodiment, the system data may be used to configure write/read parameters for accessing the NVM, such as fly height of a head, write current amplitude, read bias current amplitude, etc. (step 34). In yet another embodiment, the system data may comprise operating modules that are executed by the control circuitry within the DSD to process write/read commands received from the host (step 36).

Figure 5:
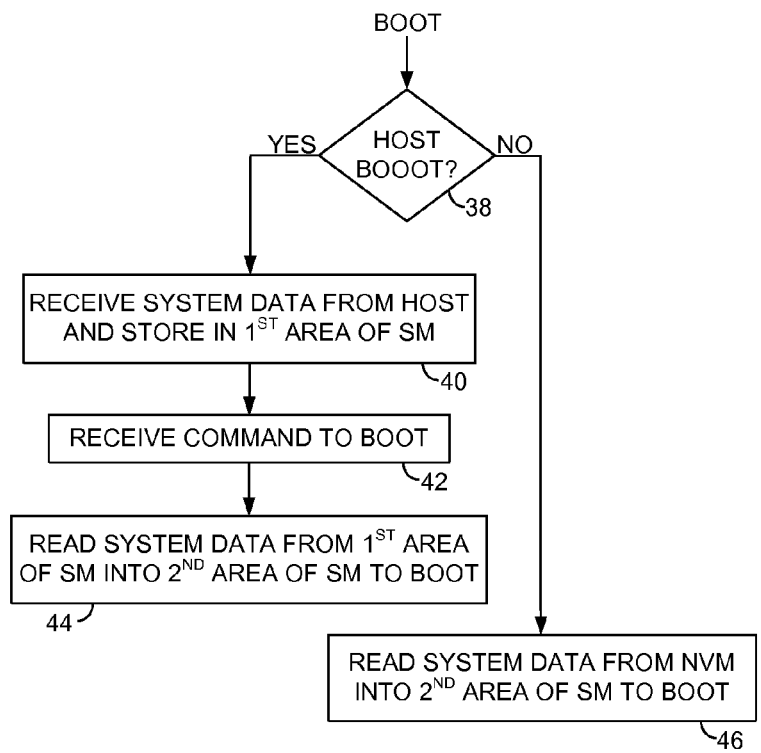
FIG. 5 is a flow diagram according to an embodiment of the present invention wherein the system data received from the host is stored in a first area of the semiconductor memory and then read into a second area of the semiconductor memory in order to boot the DSD.

In one embodiment, when the DSD boots by reading the system data from the NVM, the system data is read into the semiconductor memory. The system data is then accessed from the semiconductor memory, for example, in order to execute the operating modules and/or access operating parameters and data structures needed to operate the DSD. FIG. 5 is a flow diagram according to an embodiment of the present invention wherein when the system data is to be received from the host (step 38), the system data is stored in a first area of the semiconductor memory (step 40). After receiving the command to boot (step 42), the system data is read from the first area of the semiconductor memory into a second area of the semiconductor memory (step 44). When the system data is read from the NVM (step 38), the system data is read from the NVM and stored in the second area of the semiconductor memory (step 46). The system data is then accessed by the control circuitry from the second area of the semiconductor memory in order to execute the operating modules and/or access operating parameters and data structures needed to operate the DSD.

FIG. 6 shows a semiconductor memory 6 (RAM) according to an embodiment of the present invention comprising the first area of the semiconductor memory for storing the system data received from the host, and the second area of the semiconductor memory for storing the system data during the boot operation. Also in the embodiment of FIG. 6 the DSD comprises a non-volatile semiconductor memory 47 (e.g., a Flash) for storing initial boot code for "pre-booting" the DSD into a state where it is able to communicate with the host but has not yet accessed the NVM 4. In the embodiment of FIG. 6, the first area of the semiconductor memory is implemented as a RAM-DISK which takes the place of the NVM 4 during the boot operation.

This embodiment is further understood with reference to the flow diagram of FIG. 7 wherein the DSD receives a command to mount the RAM-DISK within the semiconductor memory (step 48). When the system data is received from the host it is stored in RAM-DISK using any suitable technique (step 50). In one embodiment, the host may issue a dedicated command for storing the system data in the RAM-DISK, and in another embodiment, the host may issue a standard write command including LBAs that are mapped to the RAM-DISK. After loading the system data into the RAM-DISK, the DSD executes access commands (e.g., read commands) internally to access the system data during the boot operation, wherein the access commands include LBAs reserved for the system data (step 52). When the DSD processes the access commands and the RAM-DISK is mounted (step 54), the access commands are executed internally by accessing the system data using the RAM-DISK (step 56). That is, the control circuitry 8 maps the LBAs to PBAs in the RAM-DISK rather than to PBAs in the NVM 4. When the RAM-DISK is un-mounted (step 54), the control circuitry 8 executes the access commands by accessing the system data using the NVM 4 (step 58). In this manner, the general code for accessing the system data within the DSD during a boot operation need not be modified once the RAM-DISK has been mounted and the LBAs are re-mapped to the RAM-DISK.

In the embodiment of FIG. 6, during a boot operation the system data is shown as being read either from the first area of the semiconductor memory 6 (boot from RAM-DISK) or from the NVM 4 (boot from NVM) directly into the second area of the semiconductor memory 6. In an alternative embodiment, the system data may be first read into a buffer area of the semiconductor memory 6, and then transferred from the buffer into the second area of the semiconductor memory 6. The buffer area is used to buffer write/read data for all access commands, including access commands during the boot operation and access commands received from the host during normal operation.

Figure 8A:
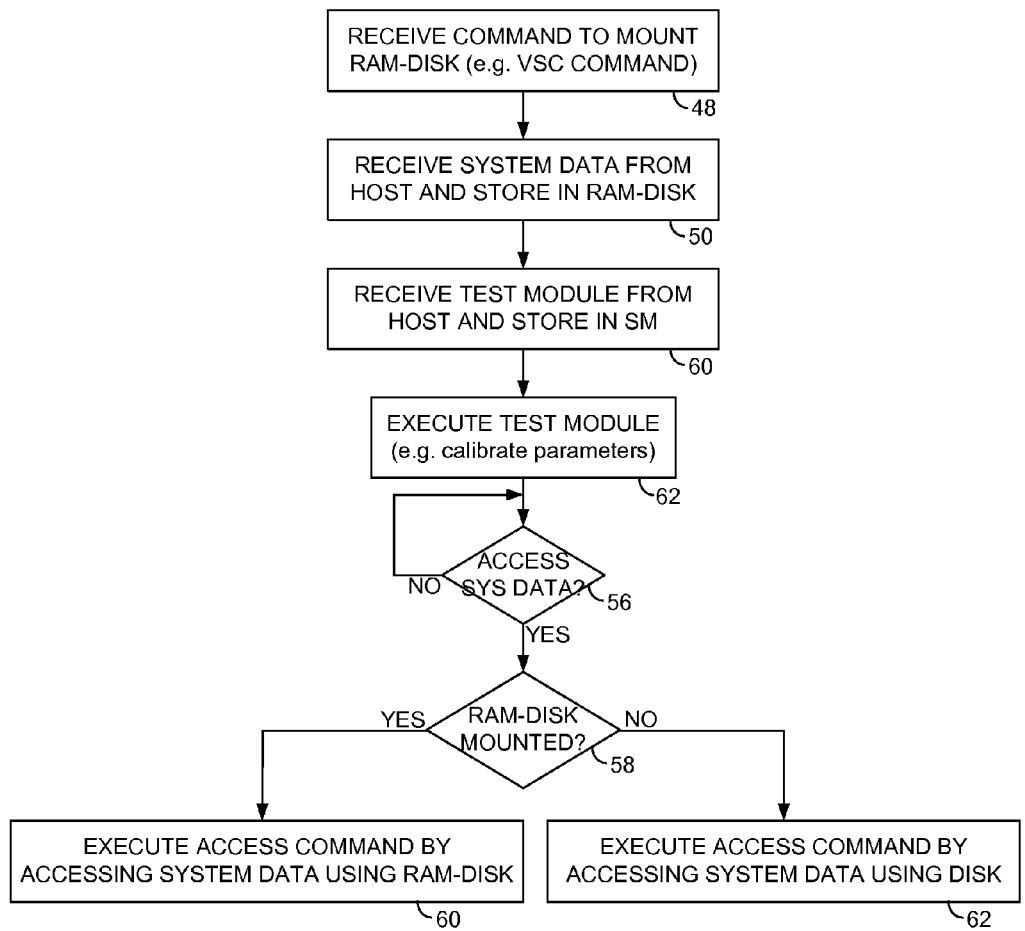
FIG. 8A is a flow diagram according to an embodiment of the present invention wherein after mounting the RAM-DISK a test module is executed by accessing the RAM-DISK.

FIG. 6 illustrates an embodiment of the present invention wherein test modules may be loaded into the semiconductor memory 6 for testing/calibrating at least one component of the DSD (e.g., a head of a disk drive). This embodiment is further understood with reference to the flow diagram of FIG. 8A wherein the test modules are received from the host and stored in the semiconductor memory (step 60). When the control circuitry 8 executes the test modules (step 62), it generates access commands that may be serviced using either the RAM-DISK or the NVM 4 depending on the LBAs. For example, the control circuitry may read system data from the RAM-DISK by specifying LBAs mapped to the RAM-DISK, and then write data to the NVM (e.g., a track on a disk) by specifying LBAs mapped to the NVM 4.

The head 24 in a disk drive (FIG. 3) is an example component that may require testing/calibrating before it can be used to access a disk 26. For example, the head 24 may be evaluated to verify it is functioning, and then a fly height of the head, write current amplitude, read bias current, micro-jog, etc. may be calibrated. In one embodiment, before the head is calibrated, it cannot be used to read any system data from the disk which is why the system data for booting the disk drive is received from the host. After calibrating the head (and/or other components), the disk drive is configured to read the system data from the disk during subsequent boot operations. In one embodiment, the system data may be received from the host and written to the disk after calibrating the components (e.g., the head), and then the disk drive is configured to read the system data from the disk.

FIG. 6 illustrates an embodiment of the invention wherein the test modules for testing/calibrating components of the disk drive may perform write commands to store a result of the test module in the RAM-DISK. For example, the test result may include performance information for one or more components (e.g., head or disk) that may be evaluated by the host to certify the components as acceptable. The host may receive the results of the test module by issuing a read command including LBAs that identify the system data, wherein the read command is serviced by mapping the LBAs to the PBAs of the RAM-DISK.

Figure 8B:
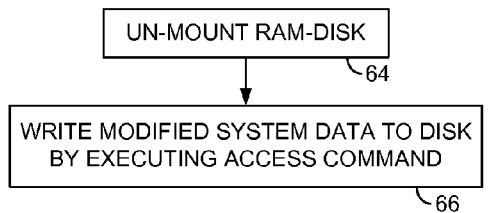
FIG. 8B is a flow diagram according to an embodiment of the present invention wherein after executing the test module the RAM-DISK is un-mounted and modified system data is written to the NVM.

FIG. 8B is a flow diagram according to an embodiment of the present invention wherein the RAM-DISK is un-mounted (step 64), for example, independently by the control circuitry within the disk drive or after receiving a host command, so that access commands to the system data are routed to the disk. After the RAM-DISK is un-mounted, system data that was modified by executing the test module (e.g., calibration parameters) are written from the semiconductor memory 6 to the area on the disk for storing the system data (step 66). For example, in one embodiment the control circuitry may issue internal write commands with LBAs corresponding to the system data, wherein the LBAs are mapped to the disk since the RAM-DISK is no longer mounted.

In another embodiment of the present invention, a spin stand may be employed in the development and/or manufacturing process of a disk drive in order to test and/or certify various components (e.g., the head and or disk). Similar to a newly manufactured disk drive, a spin stand may be unable to read system data from the disk in order to boot the spin stand. Therefore, in one embodiment the spin stand is configured to receive the system data from a host in order to boot the spin stand as described above. In one embodiment, the spin stand may never store system data on a disk but instead always boot by receiving the system data from the host. The spin stand may advantageously employ all or a portion of the firmware developed for a production disk drive rather than having to develop firmware specifically for the spin stand. Accordingly, the DSD in the embodiments of the present invention may comprise any suitable disk storage device, such as a production disk drive or a spin stand for developing and/or manufacturing the production disk drive.

Figure 9:
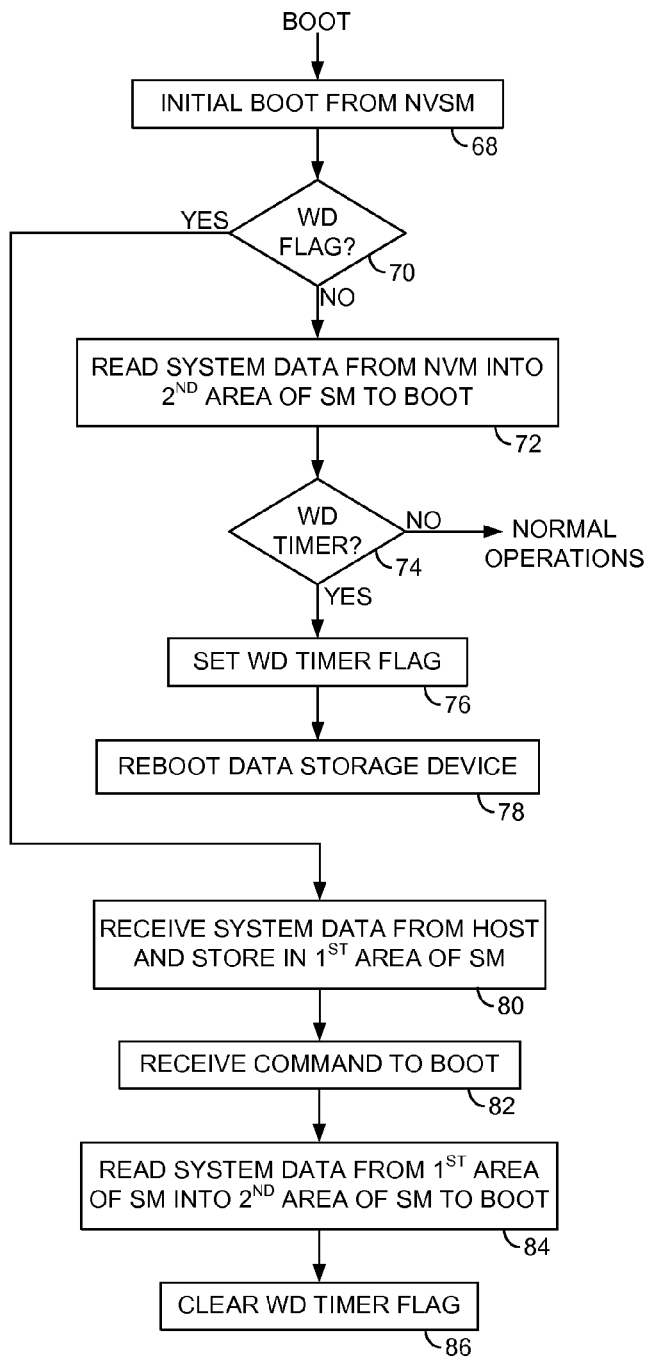
FIG. 9 is a flow diagram according to an embodiment of the present invention wherein a watchdog timer sets a flag when the DSD hangs during a boot operation so that the system data will be received from the host during a subsequent boot operation.

FIG. 9 is a flow diagram according to an embodiment of the present invention wherein the control circuitry 8 of the DSD 2 comprises a suitable watchdog timer for setting a flag when the control circuitry 8 hangs during a boot operation due to corrupted system data stored in the NVM 4. When the DSD 2 is booted, the control circuitry 8 executes a pre-boot module read from the NVSM 47 (step 68). The control circuitry 8 then evaluates the watchdog timer flag (step 70) and if cleared, begins reading the system data from the NVM 4 into the semiconductor memory 6 where it is executed to boot the DSD 2 (step 72). However, if the system data is corrupted and causes the control circuitry 8 to hang, the watchdog timer will detect this condition (step 74) for example, due to the control circuitry 8 failing to periodically reset the watchdog timer. When the hang condition is detected, the watchdog timer sets a flag (step 76) and then forces a reboot of the DSD (step 78). When the DSD reboots, the control circuitry 8 detects that the flag was set (step 70) and instead of reading the system data from the NVM 4, the control circuitry 8 receives the system data from the host and stores the system data in the first area of the semiconductor memory (step 80). Once the system data has been loaded, the control circuitry 8 receives a boot command from the host (step 82) wherein the system data is read from the first area of the semiconductor memory into the second area of the semiconductor memory in order to boot the DSD (step 84). The watchdog timer flag may be cleared (step 86) so that during the next boot operation the system data is read from the NVM 4.

Figure 10:
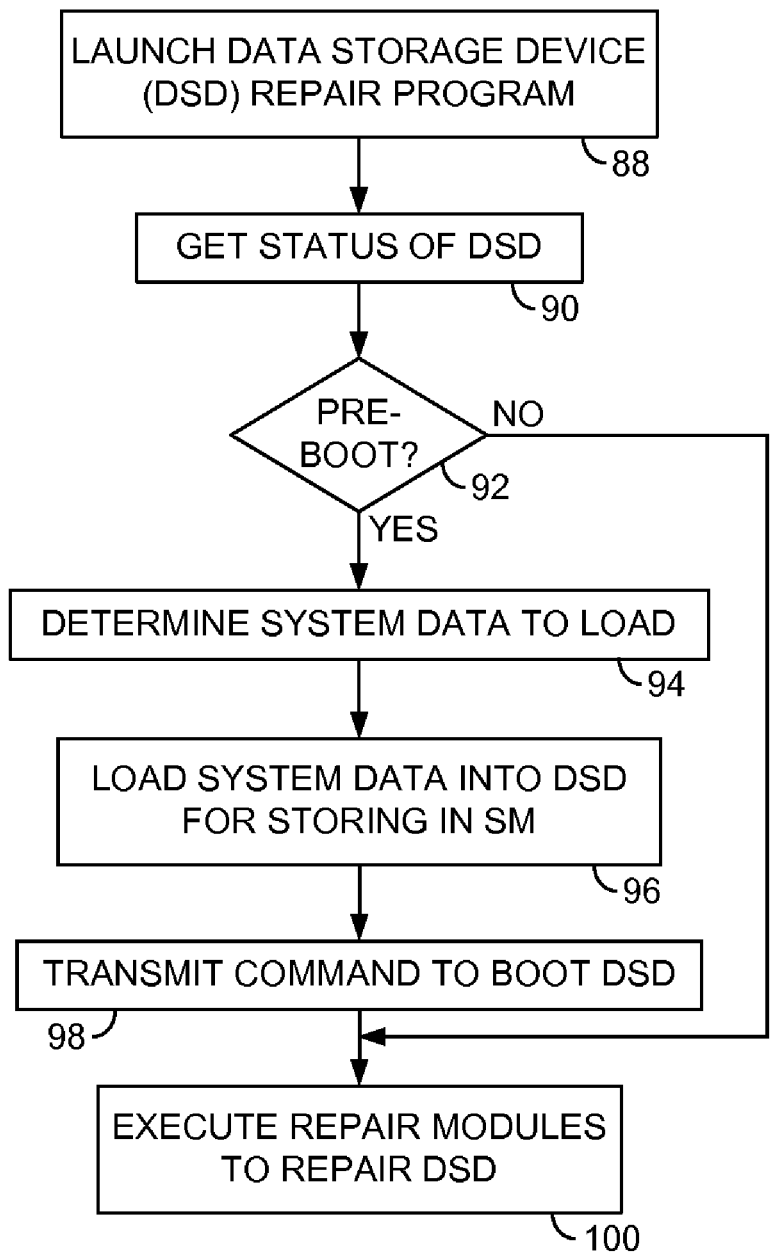
FIG. 10 is a flow diagram according to an embodiment of the present invention wherein a DSD repair program running on the host loads the system data into the DSD when needed.

FIG. 10 is a flow diagram according to an embodiment of the present invention wherein a DSD repair program may be executed (step 88) by a host in order to diagnose a problem while the DSD is deployed in the field. For example, the DSD may be the primary or secondary storage device of a desktop or laptop computer, wherein if the system data for booting the DSD becomes corrupted, the DSD may become unresponsive. The user may execute the DSD repair program from a CD ROM, a USB drive, or any other suitable alternative storage device in order to evaluate the failed DSD. In the embodiment of FIG. 10, the DSD repair program requests the status of the DSD device being repaired (step 90). If the DSD is in a pre-boot mode (step 92), it means the DSD is waiting to receive the system data from the host. The DSD repair program determines the appropriate system data to load into the DSD (step 94), and in one embodiment, may communicate over the Internet with a vendor site in order to download the appropriate system data. The DSD repair program then loads the system data into the DSD for execution from the semiconductor memory (step 96), and transmits a command to boot the DSD after downloading the system data (step 98). The DSD repair program then executes suitable repair modules in order to evaluate and repair the DSD (step 100). In one embodiment, the repair modules may be executed by the DSD repair program running on the host, and in an alternative embodiment the DSD repair program may download the repair modules to be executed by the DSD.

Any suitable control circuitry may be employed to implement the flow diagrams in the embodiments of the present invention, such as any suitable integrated circuit or circuits. For example, if the DSD is a disk drive the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on a disk and read into a volatile semiconductor memory when the DSD is powered on. In yet another embodiment, the control circuitry comprises suitable logic circuitry, such as state machine circuitry.

What is claimed is:

1. A data storage device (DSD) connected to a host, the DSD comprising:
    a non-volatile memory (NVM) operable to store system data for accessing the non-volatile memory;
    a semiconductor memory; and
    control circuitry operable to:
        determine whether to receive the system data from the host or to read the system data from the NVM, wherein it is determined to receive the system data from the host if the system data stored in the NVM is corrupted or unrecoverable; and
        when it is determined to receive the system data from the host:
            receive the system data from the host;
            store the received system data in the semiconductor memory;
            receive a command from the host to boot the DSD; and
            read the system data from the semiconductor memory to boot the DSD; and
        when it is determined to read the system data from the NVM, read the system data from the NVM to boot the DSD.

2. The data storage device as recited in claim 1, wherein when it is determined to receive the system data from the host, the control circuitry is further operable to:
    store the system data received from the host in a first area of the semiconductor memory; and
    read the system data from the first area into a second area of the semiconductor memory.

3. The data storage device as recited in claim 2, wherein:
    the control circuitry implements a RAM-DISK in the first area of the semiconductor memory; and
    the control circuitry receives a command from the host to mount the RAM-DISK.

4. The data storage device as recited in claim 3, wherein when the control circuitry receives an access command to access the system data and the RAM-DISK has been mounted, the control circuitry executes the access command using the RAM-DISK.

5. The data storage device as recited in claim 4, wherein when the control circuitry receives an access command to access the system data and the RAM-DISK is not mounted, the control circuitry executes the access command using the NVM.

6. The data storage device as recited in claim 1, wherein the control circuitry is further operable to determine whether the system data should be received from the host by receiving a command from the host.

7. The data storage device as recited in claim 1, wherein the control circuitry is further operable to determine whether the system data should be received from the host by evaluating a flag.

8. The data storage device as recited in claim 7, wherein the control circuitry comprises a watchdog timer for setting the flag.

9. The data storage device as recited in claim 1, wherein the control circuitry is further operable to configure an address translation table in response to the system data, wherein the address translation table maps logical block addresses received from the host to physical block addresses representing memory segments in the NVM.

10. The data storage device as recited in claim 1, wherein:
    the control circuitry is further operable to configure a defect management table in response to the system data; and
    the defect management table is used for mapping out defective areas of the NVM.

11. The data storage device as recited in claim 1, wherein:
    the system data comprises operating modules; and
    the control circuitry executes code segments of the operating modules in order to access the NVM.

12. The data storage device as recited in claim 1, wherein the NVM comprises a disk.

13. The data storage device as recited in claim 12, wherein:
    the control circuitry is further operable to configure a write parameter in response to the system data; and
    the write parameter is used for writing data to the disk.

14. The data storage device as recited in claim 12, wherein:
    the control circuitry is further operable to configure a read parameter in response to the system data; and
    the read parameter is used for reading data from the disk.

15. A method of operating a data storage device (DSD) connected to a host, the DSD comprising a non-volatile memory (NVM) operable to store system data for accessing the NVM, and a semiconductor memory, the method comprising:
    determining whether to receive the system data from the host or to read the system data from the NVM, wherein it is determined to receive the system data from the host if the system data stored in the NVM is corrupted or unrecoverable; and
    when it is determined to receive the system data from the host:
        receiving the system data from the host;
        storing the received system data in the semiconductor memory;
        receiving a command from the host to boot the DSD; and
        reading the system data from the semiconductor memory to boot the DSD; and
    when it is determined to read the system data from the NVM, reading the system data from the NVM to boot the DSD.

16. The method as recited in claim 15, wherein when it is determined to receive the system data from the host, the method further comprises:
    storing the system data received from the host in a first area of the semiconductor memory; and
    reading the system data from the first area into a second area of the semiconductor memory.

17. The method as recited in claim 16, wherein:
    the first area of the semiconductor memory comprises a RAM-DISK; and
    the method further comprises receiving a command from the host to mount the RAM-DISK.

18. The method as recited in claim 17, wherein when an access command is received to access the system data and the RAM-DISK has been mounted, the method further comprises executing the access command using the RAM-DISK.

19. The method as recited in claim 18, wherein when an access command is received to access the system data and the RAM-DISK is not mounted, the method further comprises executing the access command using the NVM.

20. The method as recited in claim 15, further comprising determining whether the system data should be received from the host by receiving a command from the host.

21. The method as recited in claim 15, further comprising determining whether the system data should be received from the host by evaluating a flag.

22. The method as recited in claim 21, further comprising setting the flag in accordance with a watchdog timer.

23. The method as recited in claim 15, further comprising configuring an address translation table in response to the system data, wherein the address translation table maps logical block addresses received from the host to physical block addresses representing memory segments in the NVM.

24. The method as recited in claim 15, wherein:
the method further comprises configuring a defect management table in response to the system data; and
the defect management table is used for mapping out defective areas of the NVM.

25. The method as recited in claim 15, wherein:
the system data comprises operating modules; and
the method further comprises executing code segments of the operating modules in order to access the NVM.

26. The method as recited in claim 15, wherein the NVM comprises a disk.

27. The method as recited in claim 26, wherein:
the method further comprises configuring a write parameter in response to the system data; and
the write parameter is used for writing data to the disk.

28. The method as recited in claim 26, wherein:
the method further comprises configuring a read parameter in response to the system data; and
the read parameter is used for reading data from the disk.

* * * * *